April 16, 1957  G. BADALINI  2,788,636

ROTARY PUMP AND MOTOR HYDRAULIC TRANSMISSION SYSTEM

Filed Aug. 19, 1952

INVENTOR.
GIOVANNI BADALINI
BY Young, Emery + Thompson
ATTYS

United States Patent Office

2,788,636
Patented Apr. 16, 1957

2,788,636
ROTARY PUMP AND MOTOR HYDRAULIC TRANSMISSION SYSTEM

Giovanni Badalini, Milan, Italy, assignor to S. p. A. Cambi Idraulici, Badalini, Rome, Italy Application August 19, 1952, Serial No. 305,111

Claims priority, application Italy September 19, 1951

1 Claim. (Cl. 60—53)

The present invention relates to a rotary pump and motor transmission system which permits a change in ratio between the speed of the drive and driven shafts from direct drive to the neutral position. This transmission, which may be adopted for many uses, such as vehicles and machine tools, is endowed with the utmost ease of operation even under load, is of a simple and rugged construction and offers safety of operation even after an extended use.

More particularly, the above-mentioned transmission comprises a hydraulic pump and a hydraulic motor, both of the volumetric type, hydraulically connected to each other in a closed circuit, preferably each equipped with a certain number of cylinders arranged along the generating lines of two coaxial and converging cones, the motor and pump having their axes on the same line, and the oil distribution in both pump and motor being of the front type.

Figure 1:
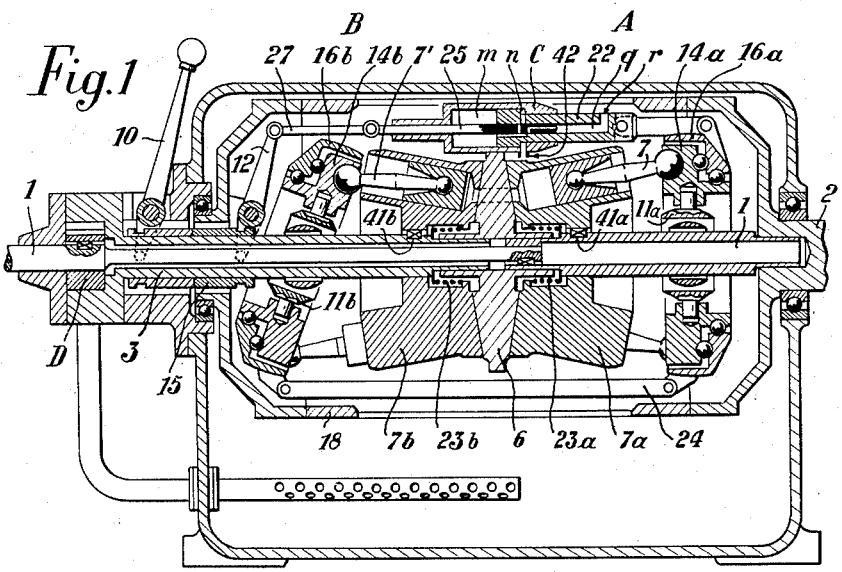
Figure 2:
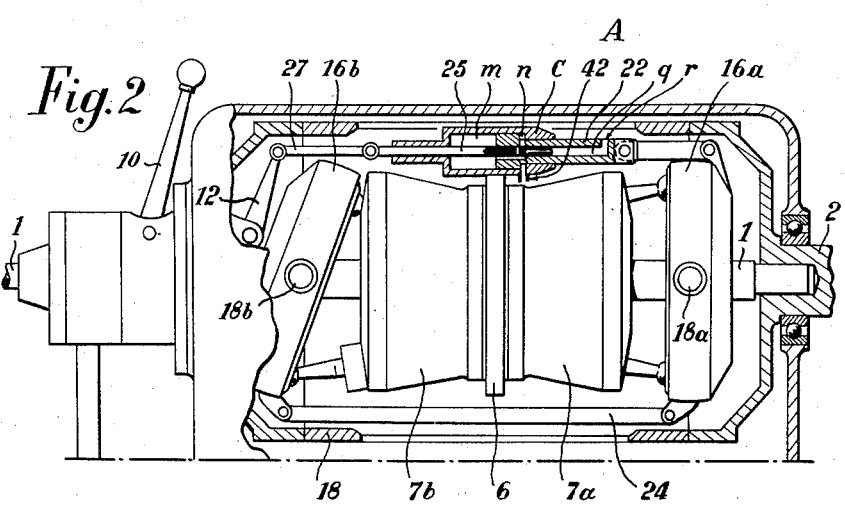
Figure 3:
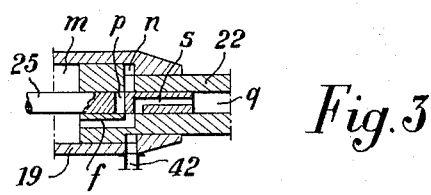

In order to gain a better understanding of the present invention, a preferred embodiment will be described in detail, the description being made with reference to the accompanying drawings, wherein:

Fig. 1 shows a schematic axial cross sectional view of a complete speed change gear, Fig. 2 shows a partly cross sectional view of the same speed change gear as in Fig. 1, and Fig. 3 shows in an axial cross sectional view and in an enlarged scale a detail of the device which controls the shifting of the plates that regulate the pump and motor displacements.

In the embodiment shown in Figs. 1 and 2, the transmission comprises a pump A and a motor B. The pump A comprises a body 7a containing said several cylinders, in each of which slides a piston; the connecting rod 7 of each piston has a free end which bears on a ring 14a supported by a tiltable plate 16a. The motor B comprises a body 7b of several cylinders, in each of which slides a piston, and the connecting rods 7' of said pistons bear by their free ends on a ring 14b supported by a tiltable plate 16b. As is clearly illustrated in Fig. 1, the driving shaft 1, when rotating, will drive ring 14a through the universal joint 11a and the cylinder block 7a through key 41a.

The connecting rod carrying ring 14a of the pump is supported by means of ball or roller bearings upon wobble plate 16a, which latter can be tilted relative to shaft 1 on bearings 18a supported on housing 18, as shown in Fig. 2. Housing 18 surrounds both pump A and motor B.

The oil distribution to the cylinders is of the front type: as is clearly visible from the drawing, cylinder body 7a is pushed by spring 23a, against distribution plate 6, which is firmly connected with housing 18. The distribution plate 6 is inwardly provided with a plurality of ducts and openings which ensure the hydraulic coupling between the pump and motor, but said ducts and opening are not shown in the drawing and the distribution plate will not be described in greater detail.

Upon the opposite side of said distribution plate 6, is cylinder body 7b of the above mentioned hydraulic motor B, said body being urged against plate 6 by spring 23b. Motor B consists of parts that are similar to those of pump A. A key 41b connects cylinder body 7b to shaft 3, the latter being coaxial with and surrounding shaft 1; piston connecting rods 7' are carried by ring 14b, supported through ball bearings upon wobble plate 16b, the latter being pivoted at 18b upon housing 18, as is pump wobble plate 16a. Housing 18 may rotate and is firmly connected with the driven shaft 2 of the transmission and, besides plates 16a and 16b and distributor 6, it also carries the control elements of said plates.

Reaction shaft 3, on the contrary, is stationary and prevents therefore the rotation of connecting rod carrier ring 14b and of cylinder body 7b of the motor.

The change in speed ratio between shafts 1 and 2 will depend upon the changes in loads, respectively, of cylinders 7a of the pump and 7b of the motor, said loads being increased or diminished by altering the slope of the respective wobble plates 16a and 16b on which are supported through said rings 14a and 14b the free ends of the connecting rods of the pistons of the pump and motor, respectively. The slope of the wobble plates is controlled by means of lever 10 acting, through sliding sleeve 15, upon lever 12, and thus influencing the below described parts.

The control of wobble plates 16a and 16b is done simultaneously, the plates 16a and 16b being connected to each other, on one side, by a rod 24. The shifting of said plates 16a and 16b is controlled through cylinder C which comprises an outer shell 19 which is fastened to housing 18 and a differential piston 22, sliding within said shell 19. Said piston forms within cylinder 19 a ring shaped chamber n and a cylinder shaped chamber m, the cross-sectional area of the latter being equal to the sum of the section of the rod of piston 22 and of ring shaped chamber n. Said ring shaped chamber n is steadily kept under pressure by means of oil received from pump A through a pipe 42 which is only partially shown in Figs. 1 and 3 and will not be described in greater detail.

Said piston 22, which is shown in an enlarged scale in Fig. 3, has an angled passage f and inside the piston there slides the small distributing piston 25, which latter has two holes s and p and is controlled by rod 27, connected with lever 12. When openings s and p do not register with hole f, as shown in Figs. 1 and 3, oil cannot go out of cylinder shaped chamber m and will therefore prevent piston 22 from moving under the thrust of the oil under pressure existing in chamber n. When it is desired to alter the slope of the wobble plates 16a and 16b, lever 10 is moved so as to move rod 27 to the left: hole s of small piston 25 will reach a position where it registers with passage f of piston 22 and, through the passage which has thus been created, chamber m will be placed in communication with exhaust passages q and r, so that the pressure maintained in chamber n by pump A will shift the piston 22 towards the left, thus following the shifting of rod 27. Also by stopping the motion of lever 10, piston 22 under the pressure from pump A further moves until passage f is shut again, thus interrupting the communication between the chamber m and the exhaust passages q and r. Hence, piston 22 stops.

By shifting lever 10, so as to move rod 27 towards the right, small piston 25 will place in communication with each other the two chambers m and n, by means of hole p and passage f, and therefore the thrust action existing within chamber m will prevail, it acting on a larger area, which will bring about a shifting of piston 22 in the same direction as rod 27, i. e. to the right.

Also in this case, when the motion of lever 10 and therefore of rod 27 is stopped, piston 22 moves toward the right until the port p is again shut as shown in Fig. 3.

Hence, it is apparent that the swinging of wobble plate 16a and of wobble plate 16b, connected to the former by means of rod 24, may be controlled by moving lever 10.

As can be easily seen from the previous description, the operating pressure of the transmission, i. e. the oil pressure, is utilized in order to overcome all the efforts that are necessary for operating the transmission itself. Moreover, it can be seen from the above that to each position of lever 10 there will correspond only one position of plates 16a and 16b, and therefore one well defined transmission ratio, that can be read from a suitable graduation combined with lever 10.

In the position shown in Fig. 1, wobble plate 16a of pump A is placed perpendicularly to the rotating axis and therefore, in spite of rotation of shaft 1, the pump pistons will not operate and will remain always in the same position during the rotation of the whole assembly; there will therefore occur no movement of the driven shaft 2. In other words, in this position, the transmission is in neutral position.

Now, if wobble plate 16a is tilted through a certain angle, the pistons of pump A will acquire a certain displacement and some oil will be forced into the cylinder chambers of motor B, and this will bring about the rotation of housing 18, due to the fact that cylinder body 7b and the connecting rod system of said cylinders are kept stationary by fixed reaction shaft 3. Housing 18 is however firmly connected with shaft 2, so that a rotation of shaft 2 will take place, with a greater or lesser speed, according to the greater or lesser slope of wobble plate 16a.

As soon as the motor housing rotates, however, and due to the fact that it forms a unit with the pump housing, the latter will also rotate and therefore the pump delivery will be in proporion to relative rotation existing between pump cylinder body 7a and the pump housing, i. e. to relative rotation between driving shaft and driven shaft. Such delivery will be the one received by the hydraulic motor.

Summarizing, in the position shown in Fig. 1, the driving shaft 1 does not transmit the motion to the driven shaft 2 since ring 14a which is connected to the driving shaft may rotate with respect to the plate 16a, which latter does not move; in a position in which the tiltable plate 16b of the motor B is perpendicular to the driving shaft and therefore the tiltable plate 16a of the pump has the greatest inclination with respect to the driving shaft, all the motion is transmitted to the driven shaft 2 direcily from the driving shaft through the tiltable plate 16a and the housing 18 connected thereto. The rotation of housing 18 causes the rotation of the tiltable plate 16b, but the rotation of the latter has no effect on the pistons of the cylinders of the motor so that no passage of liquid occurs from the pump to the motor, since plate 16b may rotate with respect to ring 14b. In all the other positions intermediate between the two positions referred to above, the rotary action is transmitted from the driving shaft to he driven shaft partly through the tiltable plate 16a and partly through the tiltable plate 16b, the rotation of which is affected by the liquid which passes from the pump A to the motor B. However, it is to be noted that in the intermediate positions, the rotation speed of ring 14a is different from and greater than the rotation speed of the tiltable plate 16b.

If we suppose therefore that the speed of revolution of driving shaft 1 of the transmission remains unaltered, the speed of revolution of driven shaft 2 will depend exclusively upon the ratio between the capacity of motor B and that of the pump A: in other words, the larger such ratio, the higher will be the transmission ratio and vice versa.

The capacity of the motor and that of the pump will exert its influence, provided the pressure is the same, only the entity of the torque that can be transmitted.

In the extreme instances, when the pump displacement is equal to zero, one shaft will be placed in neutral, as stated above, relative to the other, while, when the motor displacement is equal to zero, the transmission ratio is 1:1. The pump, in such case, will have a zero delivery, although it is in a position of highest displacement, because the motor will not be able to take oil from it: in other words, the pump will transmit revolutions and performance entirely from the driving shaft to the driven shaft, as if they are rigidly coupled.

The torque available on the driven shaft will be that transmitted by the rotating housing 18 and corresponds to the sum of the torque generated by the pump and that generated by the motor due to the oil which enters the cylinders of the motor owing to the difference in speed between the driving and the driven shaft.

In the embodiment shown in the drawings, pump D is also foreseen, with the purpose of recovering from the tank represented by the stationary housing of the assembly, the oil lost due to small leaks and bringing it back within the closed circuit of pump and motor. Of course, constructive details of the various parts described above and auxiliary devices for the control of the chief elements of the speed change gear above described, may vary according to requirements, without departing from the scope of the present invention.

What I claim is:

A rotary pump and motor hydraulic transmission apparatus which comprises, in combination, an outer stationary casing and a stationary reaction shaft fastened to and supported inside said casing, a rotating housing contained in said casing and supported for rotation thereby, an end of the said housing being in the shape of a driven shaft which projects from said casing, a driving shaft coaxially contained in the said reaction shaft and rotatable with respect thereto, said driving shaft being mounted inside said housing to selectively rotate relative to the housing, said driving shaft being journalled at one end in the said housing and extending at the other end from said reaction shaft and said casing, a multi-cylinder hydraulic pump having a cylinder body keyed on said driving shaft and a multi-cylinder hydraulic motor having a cylinder body keyed on the said reaction shaft, pistons and connecting rods in the pump cylinders and in the motor cylinders, the cylinders in each said cylinder body having their axes arranged according to the generating lines of a cone, a first wobble plate pivoted upon said housing and containing a coaxial ring rotatably mounted therein and arranged to receive the ends of the connecting rods of the pump pistons, said ring being tiltably mounted on said driving shaft and in driving relation therewith, whereby said first wobble plate will assume a position in which the rotation of the driving shaft is permitted with respect to the housing and a plurality of positions in which said driving shaft and said housing both rotate, a second wobble plate pivoted upon said housing and containing a ring rotatably mounted therein and arranged to receive the ends of the connecting rods of the motor pistons, the ring of said second wobble plate being tiltably mounted in non-rotatable relationship on said reaction shaft, said second wobble plate being arranged to assume a position in which the rotation of the housing does not affect the pistons of the motor and to assume a plurality of positions in which the rotation of the housing causes a variable stroke of the pistons of the motor cylinders and a passage of liquid from the pump to the motor, a distributing plate interposed between said pump cylinder body and said motor cylinder body and arranged to provide a fluid circuit between the pump cylinders and the motor cylinders, said distributing plate being connected to said rotatable housing and receiving the heads of said pump and motor cylinder bodies, means operable from the outside of the casing and connected to the said distributing plate and the said housing and associated with the said first and second wobble plates to control the slope of said wobble plates and thereby the stroke of the pistons of the pump cylinders and motor cylinders.

References Cited in the file of this patent

UNITED STATES PATENTS

| | | |
|---|---|---|
| 1,840,872 | Rayburn | Jan. 12, 1932 |
| 2,257,724 | Bennetch | Oct. 7, 1941 |
| 2,260,859 | Neuland | Oct. 28, 1941 |
| 2,371,974 | Neuland | Mar. 20, 1945 |
| 2,678,536 | Morgan | May 18, 1954 |
| 2,687,049 | Ebert | Aug. 24, 1954 |

FOREIGN PATENTS

| | | |
|---|---|---|
| 202,309 | Great Britain | Nov. 10, 1924 |